(12) United States Patent
Hoshinaka et al.

(10) Patent No.: US 7,634,781 B2
(45) Date of Patent: Dec. 15, 2009

(54) RECORDING MEDIUM DRIVING DEVICE

(75) Inventors: Eiji Hoshinaka, Tokorozawa (JP); Youichi Konno, Tokorozawa (JP); Hitoshi Ueno, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 267 days.

(21) Appl. No.: 11/666,343

(22) PCT Filed: Oct. 28, 2005

(86) PCT No.: PCT/JP2005/019915

§ 371 (c)(1),
(2), (4) Date: Sep. 20, 2007

(87) PCT Pub. No.: WO2006/046707

PCT Pub. Date: May 4, 2006

(65) Prior Publication Data
US 2008/0059982 A1 Mar. 6, 2008

(30) Foreign Application Priority Data
Oct. 29, 2004 (JP) .............................. 2004-316522

(51) Int. Cl.
*G11B 17/04* (2006.01)
(52) U.S. Cl. ...................................... 720/623
(58) Field of Classification Search .................. 720/623
See application file for complete search history.

(56) References Cited
U.S. PATENT DOCUMENTS 6,137,761 A * 10/2000 Oh et al. ..................... 720/620
6,222,811 B1 * 4/2001 Sakurai et al. .............. 720/620
6,477,013 B1 * 11/2002 Kang et al. ............... 360/236.3
6,880,160 B1 * 4/2005 Lee et al. .................... 720/623
2002/0131209 A1 * 9/2002 Anaya-Dufresne et al. ........................ 360/236.2
2006/0037034 A1 * 2/2006 Lee ............................ 720/623
2006/0190949 A1 * 8/2006 Shimomae ................. 720/621
2007/0192776 A1 * 8/2007 Ahn et al. ................... 720/623
2007/0250843 A1 * 10/2007 Fujisawa et al. ............ 720/623
2007/0277187 A1 * 11/2007 Fujisawa .................... 720/623

FOREIGN PATENT DOCUMENTS

| JP | 2-118955 | 5/1990 |
|---|---|---|
| JP | 2004-22040 | 1/2004 |
| JP | 2004-246970 | 9/2004 |

* cited by examiner

*Primary Examiner*—Allen T Cao
(74) *Attorney, Agent, or Firm*—Kratz, Quintos & Hanson, LLP

(57) ABSTRACT

Provided are a disc guide mechanism 41 that is disposed on one end side of a slot 10A in a drive unit body 10 and guides an optical disc 1; and a disc diameter detecting mechanism 42 that is disposed on the other side of the slot 10A in the drive unit body 10 and retracts the disc guide mechanism 41 when the optical disc 1 inserted in the slot 10A is large and advances the optical disc 1 when the optical disc 1 is small. The disc guide mechanism 41 and the disc diameter detecting mechanism 42 which are respectively disposed on sides of the slot 10A can center the optical disc 1 in accordance with a diameter of the optical disc 1.

8 Claims, 15 Drawing Sheets

RECORDING MEDIUM DRIVING DEVICE

TECHNICAL FIELD

The present invention relates to a recording medium drive equipped with a slot that is provided to a drive unit body and allows insertion and ejection of a disc-like recording medium; and a driving section that is provided substantially at a center portion in the drive unit body and rotates the disc-like recording medium.

BACKGROUND ART

As a recording medium drive of the type, there has been known a so-called slot-in type disc drive that automatically transfers a disc-like recording medium to a predetermined position when the disc-like recording medium is inserted to a predetermined position by a user.

Some disc drives of this type can be used for both of a 12 cm disc-like recording medium and an 8 cm disc-like recording medium.

As an example of related disc drives that can be used for two types of disc-like recording media having different diameters, there is a disc reproducing device equipped with a transport roller for inserting a disc along a disc insertion opening; and central, right and left sensors provided in the vicinity of the transport roller for judging a diameter of the disc (Patent Document 1).

According to Patent Document 1, the transport roller transfers the disc to a predetermined position while abutting and sliding on a flat portion of the disc. After the three types of sensors judge the diameter of the disc, the disc is positioned at a predetermined position by a positioning mechanism that has a positioning pin provided on a rear side of the device.

[Patent Document 1] JP-A-H02-118955 (see pages 3 and 4 and FIGS. 1 and 2)

DISCLOSURE OF THE INVENTION

Problems to be Solved by the Invention

This slot-in type disc drive includes a thin type. The thin type disc drive has been used for a 12 cm disc. Currently there is no thin type disc drive that can be used for both of a 12 cm disc and an 8 cm disc.

It may be conceived to employ the arrangement of Patent Document 1 for the thin type disc drive. However, since the invention disclosed in Patent Document 1 were not made with a thin type disc drive in mind, it is not possible to employ the arrangement as it is for a thin type disc drive.

Specifically, the transport roller of Patent Document 1 is disposed at a position to face a flat surface of the disc, so that downsizing in thickness is limited, which may be one problem to be solved.

Additionally, since the three types of sensors (the center, right and left sensors) are provided, spaces for these sensors are necessary, which may limit the downsizing in thickness of the disc drive. This may be another problem to be solved.

An object of the present invention is to provide a recording medium drive that can be used for disc-like recording media having different diameters and contribute to downsizing in thickness.

Means for Solving the Problems

A recording medium drive according to the present invention includes: a drive unit body having a slot for insertion and ejection of a disc-like recording medium; a driving portion that is provided in the drive unit body and rotates the disc-like recording medium; a disc guide mechanism that is provided on one end side of the slot and guides the disc-like recording medium; and a disc diameter detecting mechanism that is connected with the disc guide mechanism and moves the disc guide mechanism in accordance with a diameter of the disc-like recording medium. The disc guide mechanism is disposed on the end side of the slot and biased toward the opposite end side. The disc detecting mechanism retracts the disc guide mechanism toward the one end side when the disc-like recording medium having a large diameter is inserted in the slot.

EXPLANATION OF CODES

Figure 1:
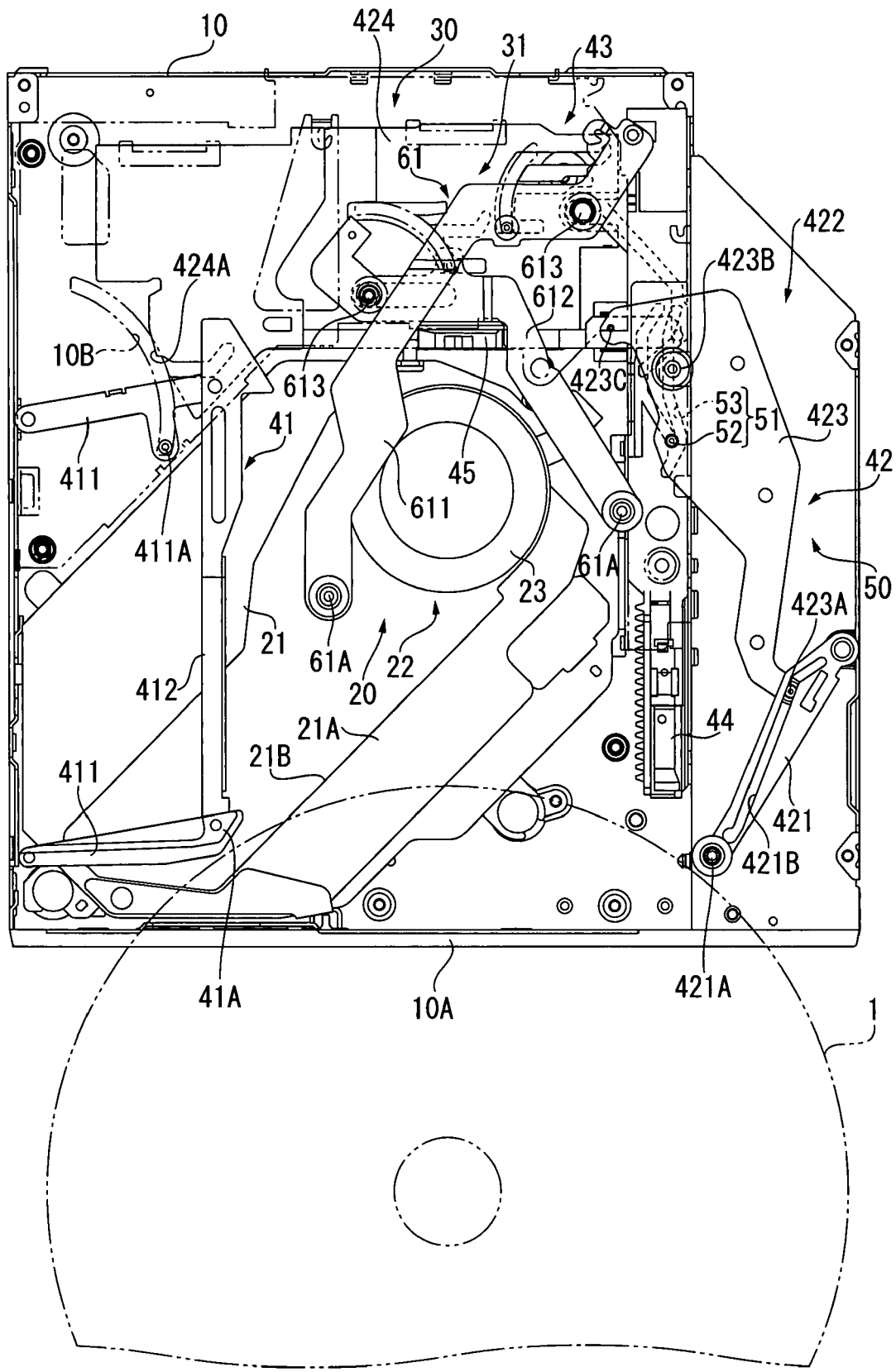
FIG. 1 is a plan view schematically showing a recording medium drive of an embodiment of the present invention.

1: optical disc (disc-like recording medium)
10: drive unit body
10A: slot 23: turntable (driving section)
41: disc guide mechanism (second disc feeding mechanism)
   41A: abutting portion
   411: first link
   412: second link
42: disc diameter detecting mechanism
   421: arm
   421A: abutting portion
   421B: guide groove
   422: arm link mechanism
   423: connecting member
   423A: projection
   424: anti-rotation link
   424A: stopper
43: disc ejecting mechanism
44: first drive cam
45: second drive cam
50: disc feeding mechanism
51: disc feeding cam portion
52: projection
53: cam groove
   53A: first cam groove
   53B: second cam groove
   53C: common cam groove
   53D: curved portion
60: disc ejecting mechanism
61: first disc feeding mechanism
   61A: abutting portion
   611, 612: eject arm

BEST MODE FOR CARRYING OUT THE INVENTION

An embodiment of the present invention will be described below with reference to the attached drawings.

In this embodiment, a disc recording medium may be read-only or write-only. The disc recording medium may not be limited to an optical disc, but may be any type of disc recording medium such as a magnet disc and a magnetooptical disc. In the embodiment, a thin slot-in type disc drive installed in an electric appliance such as a portable personal computer is exemplified. However, the disc drive may have a stand-alone configuration like a game console or a reproducing device for recording and reproducing video data.

(Arrangement of Disc Device)

In FIG. 1, a recording medium drive of the embodiment is a so-called thin slot-in type disc drive installed in an electric appliance such as a portable personal computer. The disc drive performs information processing including reading processing in which information recorded on a recording surface (not shown) provided on at least one surface of a discoidal optical disc 1 (a disc-like recording medium) detachably attached to the disc drive; and recording processing in which information is recorded on the recording surface.

The disc drive includes a drive unit body 10. For example, the drive unit body 10 may be made of metal and have a substantially box-like shape and an inner space.

Inside the drive unit body 10, a disc processing portion 20 (a so-called traverse mechanism), a transfer unit 30 that transfers the optical disc 1 and a control circuit (not shown) are provided. On a front side of the drive unit body 10, a slot 10A for inserting and ejecting the optical disc 1 extends in the right to left direction in FIG. 1.

The disc processing portion 20 includes a base 21. For example, the base 21 may be made of metal and have a substantially plate-like shape of which one end is swingably supported by the drive unit body 10.

The base 21 is provided with a disc rotation driver 22 disposed on one end side in a longitudinal direction of the base 21 (i.e. disposed in the vicinity of a peripheral end portion of the base 21). The disc rotation driver 22 includes a spindle motor (not shown) and a turntable 23 integrally formed on an output shaft of the spindle motor. The spindle motor is controllably connected to the control circuit. The spindle motor is driven by electricity supplied from the control circuit.

The turntable 23 is a driving section provided substantially at a center portion in the drive unit body 10. The turntable 23 rotates the optical disc 1.

The base 21 is provided with an information processing section (not shown). The information processing section is supported like a bridge over a pair of guide shafts (not shown). A moving mechanism (not shown) moves the information processing section toward and away from the turntable 23.

The information processing section is provided with a pickup having a light source, a lens that converges light from the light source and an optical sensor (not shown) that detects output light reflected by the optical disc 1.

A cover 21A is integrally attached to the base 21. The cover 21A is provided with a longitudinal processing opening 21B substantially at a center portion of the cover 21A. The processing opening 21B is formed as a cutout extending along the longitudinal direction of the base 21. The processing opening 21B is positioned so as to correspond to a moving path of the pickup and a position of the turntable 23.

The transfer unit 30 includes a transfer motor (not shown) that is provided to the drive unit body 10 and driven by, for example, the control circuit; and a link mechanism 31 that interlocks in accordance with the drive of the transfer motor.

The link mechanism 31 includes a disc guide mechanism 41, a disc diameter detecting mechanism 42, a disc ejecting mechanism 43, a first drive cam 44 and a second drive cam 45. The disc guide mechanism 41 is provided on one end side of the slot 10A in the drive unit body 10 (the left side in FIG. 1). The disc diameter detecting mechanism 42 is provided on the other end side of the slot 10A in the drive unit body 10 (the right side in FIG. 1). The disc ejecting mechanism 43 ejects the optical disc 1 disposed on the turntable 23. The first and second drive cams 44 and 45 swing the base 21.

The first and second drive cams 44 and 45 are each provided with an engagement projection. The engagement projections are respectively engaged with cam grooves (not shown) formed in two lateral surfaces of the base 21. The first and second drive cams 44 and 45 are formed in a substantially elongate shape and are advanced and retracted along the longitudinal direction by a motor and a gear mechanism (both not shown). Thereby, the base 21 is swung so as to move toward and away from the recording surface of the optical disc 1 mounted on the turntable 23.

The disc guide mechanism 41 is provided with two first links 411 with a predetermined distance therebetween and a second link 412. Each of the first links 411 is rotatably supported by the drive unit body 10 at one end. The second link 412 connects the other ends of the first links 411. The disc guide mechanism 41 is a parallel link that enables advancement and retraction of the optical disc 1 toward and away from the other end side of the slot 10A (the right side in FIG. 1).

The first links 411 and the second link 412 are disposed in a plane orthogonal to a rotation axis of the turntable 23.

One of the two first links 411 is disposed on the slot 10A side. The other first link is disposed on a rear side. The first link on the rear side is provided with a pin 411A that can move along an arc-shaped guide portion 10B formed on the drive unit body 10.

The first links 411 are parallel to each other and connected with the second link 412 at positions that are away by a common distance from respective supporting points. Accordingly, the second link 412 is adapted to move toward and away from the turntable 23.

A spring (not shown) is provided between one of the two first links 411 and the drive unit body 10. Due to the spring force, the first link 411 constantly rotates clockwise and the second link 412 is constantly biased toward the turntable 23.

Provided in the vicinity of a connecting portion of the first link 411 disposed on the slot 10A side and the second link 412 is an abutting portion 41A abutting to a peripheral portion of the optical disc 1.

The disc diameter detecting mechanism 42 causes the disc guide mechanism 41 to retract when the optical disc 1 inserted in the slot 10A is a first disc-like recording medium having a large diameter and to advance when the optical disc 1 is a second disc-like recording medium having a smaller diameter than that of the first disc-like recording medium.

Specifically, the disc diameter detecting mechanism 42 is provided with an arm 421 and an arm link mechanism 422 connected with the arm 421. One end portion of the arm 421 abuts to the optical disc 1. The other end portion of the arm 421 is rotatable relative to the drive unit body 10. The arm link mechanism 422 allows the disc guide mechanism 41 to retract when a rotation angle of the arm 421 is large and prevents the disc guide mechanism 41 from retracting when the rotation angle of the arm 421 is small.

Provided to one end of the arm 421 is a roller-like abutting portion 421A that abuts to a peripheral portion of the optical disc 1. The other end is rotatably supported by the drive unit body 10. The arm 421 is made with a plate member having a narrow elongate rectangular shape. Along a longitudinal direction of the arm 421, a guide groove 421B is formed.

The arm link mechanism 422 is provided with a connecting member 423 in a substantially flat plate shape and an anti-rotation link 424 in a substantially flat plate shape. A projection 423A guided along the guide groove 421B is provided at one end of the connecting member 423. One end of the anti-rotation link 424 is connected with the connecting member 423.

The arm 421 and the connecting member 423 are disposed at positions opposite to the disc guide mechanism 41 with the turntable 23 interposed and are disposed substantially in the same plane as the disc guide mechanism 41.

The other end of the connecting member 423 is supported so as to be rotatable relative to a rotary shaft 423B fixed to the drive unit body 10. The connecting member 423 is provided with an engagement portion 423C at a position opposite to the projection 423A with the rotary shaft 423B interposed.

The anti-rotation link 424 is provided on a rear side relative to the turntable 23 so as to be movable in the right to left direction in the figure. A right end of the anti-rotation link 424 is engageable with the engagement portion 423C. Provided on a left end of the anti-rotation link 424 is a stopper 424A that can abut to a pin 411A of the first link 411.

Figure 2A:
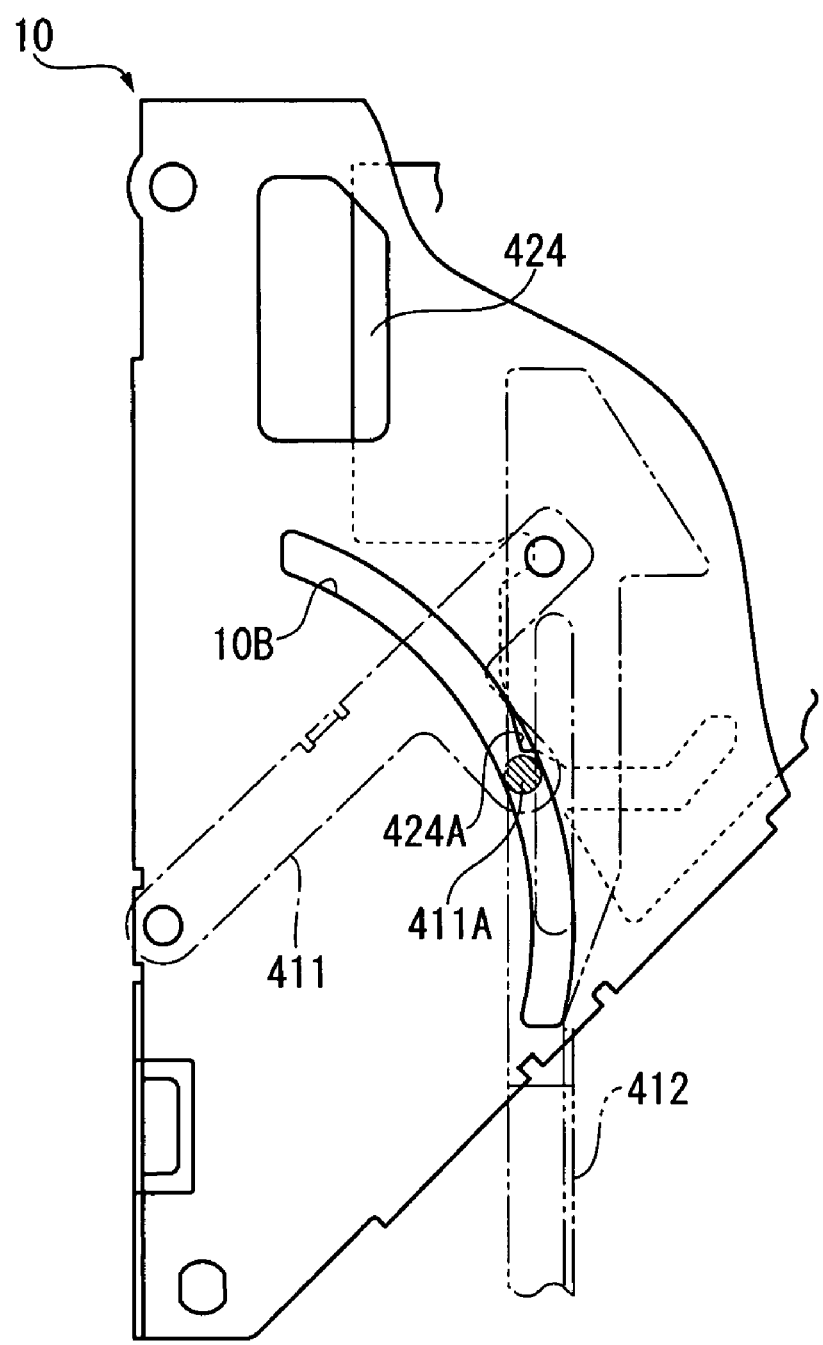
FIG. 2A is a schematic illustration showing a relationship between an anti-rotation link and a first link, FIG. 2A showing a state in which the first link is right before an interference with the anti-rotation link.
Figure 2B:
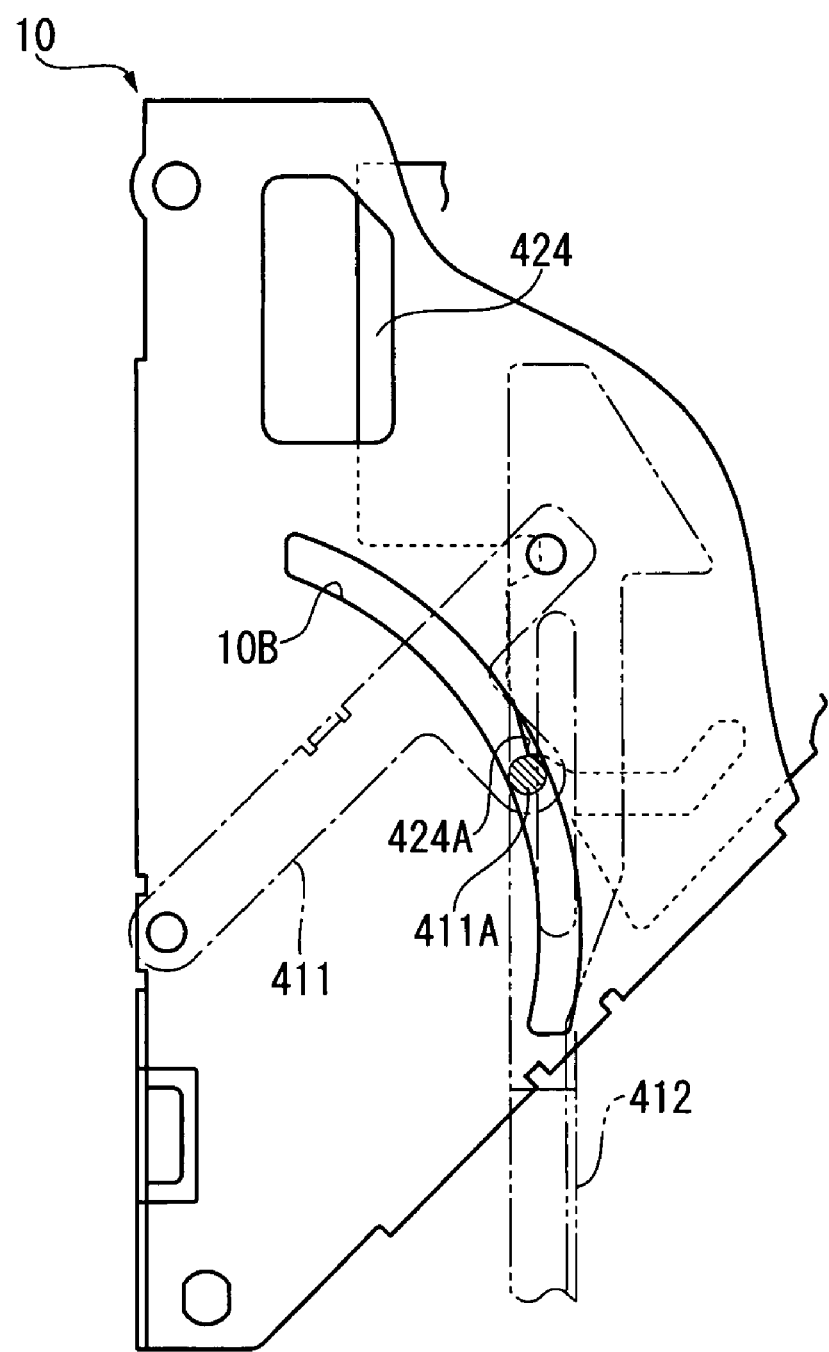
FIG. 2B is a schematic illustration showing the relationship between the anti-rotation link and the first link, FIG. 2B showing a state in which the first link has just begun to interfere with the anti-rotation link.

When the anti-rotation link 424 is positioned on the left side of the figures, the stopper 424A is positioned on a movement locus along the guide portion 10B of the pin 411 A of the first link 411 (FIGS. 2A and 2B). When the anti-rotation link 424 is positioned on the right side of the figures, the stopper 424A is positioned at a position deviated from the movement locus of the pin 411A of the first link 411.

Figure 4:
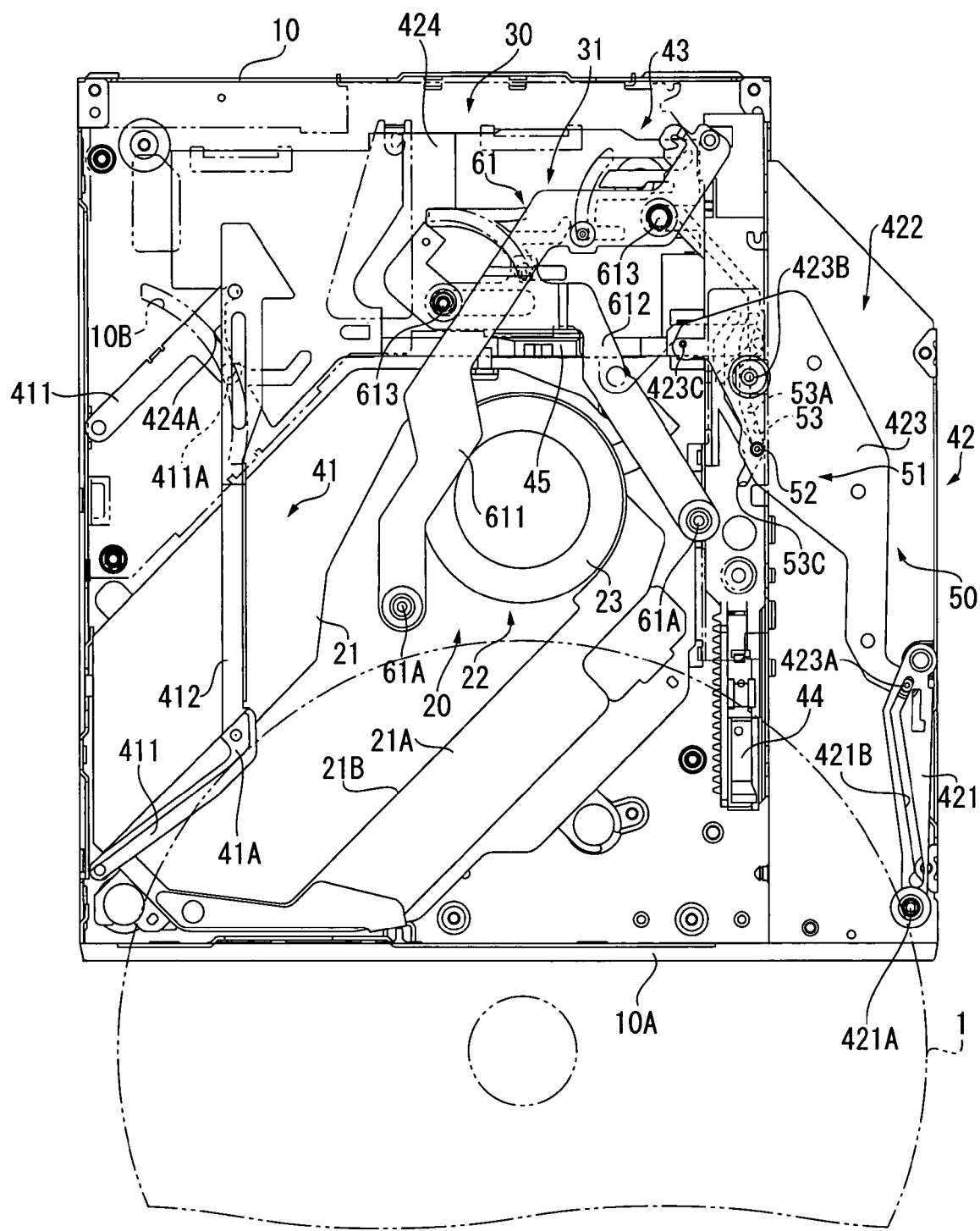
FIG. 4 is an illustration corresponding to FIG. 1, the illustration explaining a first operation of the aforesaid embodiment in which a large optical disc is set.

Hence, in the embodiment, when the optical disc 1 of a large diameter (for example, 12 cm) is inserted from the slot 10A, the optical disc 1 presses the arm 421 to cause a large counterclockwise rotation of the arm 421 and accordingly a large counterclockwise rotation of the connecting member 423 (see FIG. 4). The large rotation of the connecting member 423 moves the anti-rotation link 424 to the right side in FIG. 1 to cause the stopper 424A to be deviated from the movement locus of the pin 411A, thereby allowing a retraction of the disc guide mechanism 41 (see FIG. 5).

On the other hand, when the optical disc 1 of a small diameter (for example, 8 cm) is inserted, the optical disc 1 presses the arm 421 to cause a small counterclockwise rotation of the arm 421 and accordingly a small counterclockwise rotation of the connecting member 423. Even when the connecting member 423 is rotated, since the rotation amount is small, the anti-rotation link 424 remains on the left side in FIG. 1 and the stopper 424A remains on the movement locus of the pin 411 A (see FIG. 10). When the optical disc 1 is inserted further from such a state, the second link 412 moves to a predetermined position in a direction away from the turntable 23 (i.e. the disc guide mechanism 41 is retracted) as shown in FIG. 2A. When the second link 412 reaches the predetermined position, the pin 411A abuts to the stopper 424A and the second link 412 is prevented from moving as shown in FIG. 2B.

Referring to FIG. 1, in the embodiment, a disc feeding mechanism 50 is provided with the arm 421, the connecting member 423, the first drive cam 44 that is connected with the other end of the connecting member 423 and advances and retracts the connecting member 423, and a switch that detects that the optical disc 1 is inserted from the slot 10A to a predetermined position. The switch is provided with later-described eject arms 611 and 612. When the inserted optical disc 1 rotates the eject arms 611 and 612, the first drive cam 44 is advanced.

When the disc feeding mechanism 50 detects with the switch that the optical disc 1 is inserted to the predetermined position, the arm 421 inserts the optical disc 1 to a rear side such that the optical disc 1 is fed to the turntable 23.

The connecting member 423 and the first drive cam 44 are provided with a disc feeding cam portion 51 that reduces a feeding amount of the optical disc 1 for feeding the optical disc 1 to the turntable 23 when the optical disc 1 is large and increases the feeding amount of the optical disc 1 for feeding the optical disc 1 to the turntable 23 when the optical disc 1 is small.

The disc feeding cam portion 51 is provided with a projection 52 disposed on the connecting member 423 and a cam groove 53 engaged with the projection 52 and formed in the first drive cam 44.

Figure 3:
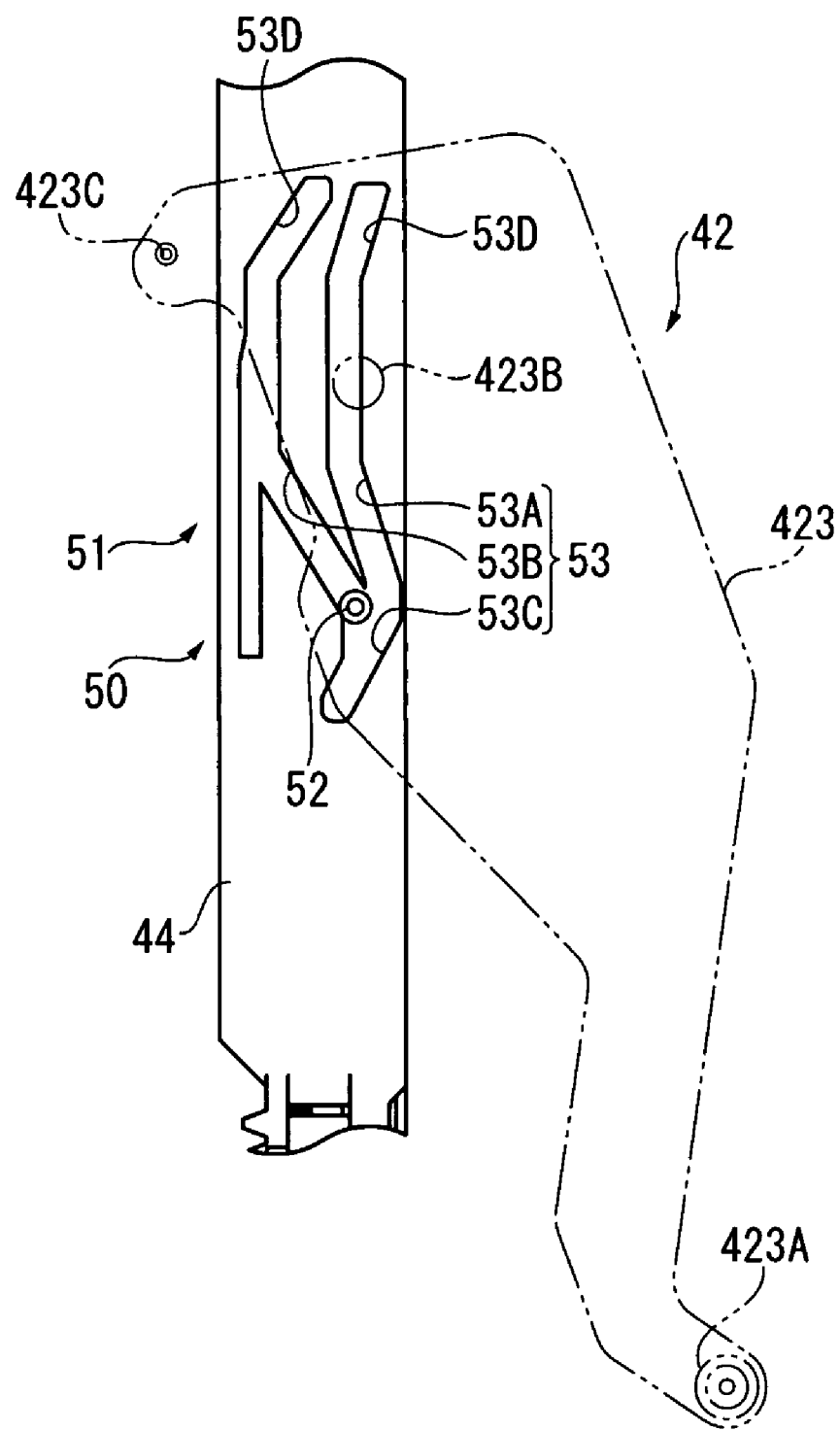
FIG. 3 is a plan view showing in detail a structure of a cam groove.

In FIG. 3, the cam groove 53 is provided with a first cam groove 53A that feeds the optical disc 1 of a large diameter, a second cam groove 53B that feeds the optical disc 1 of a small diameter and a common cam groove 53C. On one end of the common cam groove 53C, the first and second cam grooves 53A and 53B join together.

The first cam groove 53A and the second cam groove 53B are formed so as to extend in the moving direction of the first drive cam 44. The second cam groove 53B has a longer path than the first cam groove 53A, thereby changing the rotation amount of the arm 421.

The first cam groove 53A and the second cam groove 53B are each provided with a curved portion 53D on the other end side. When the projection 52 is guided to the curved portion 53D, the arm 421 is spaced from the optical disc 1 via the connecting member 423. In the embodiment, when the turntable 23 rotates, the first drive cam 44 is at the most advanced position, where the projection 52 is guided to the curved portion 53D of the first cam groove 53A or the curved portion 53D of the second cam groove 53B, so that the optical disc 1 is spaced from the disc feeding mechanism 50. Similarly, when the turntable 23 rotates, the disc guide mechanism 41 is at the most retracted position so as to be spaced from the optical disc 1.

Referring to FIG. 1, the disc ejecting mechanism 43 is provided with a first disc feeding mechanism 61 disposed on a rear side in the drive unit body 10; and a second disc feeding mechanism that feeds the optical disc 1 fed by the first disc feeding mechanism 61 to the slot 10A, the second disc feeding mechanism positioned on the slot side relative to the first disc feeding mechanism 61. In the embodiment, the second disc feeding mechanism is the disc guide mechanism 41.

The first disc feeding mechanism 61 is provided with the pair of eject arms 611 and 612. One end of each eject arm 611, 612 is rotatably supported in the drive unit body 10 via a rotary shaft 613. The eject arms 611 and 612 are rotated in accordance with advancement and retraction of the first and second drive cams 44 and 45.

The eject arms 611 and 612 are disposed with the turntable 23 interposed so as to hold a peripheral portion of the optical disc 1. Provided on a tip end of each eject arm 611, 612 is a roller-like abutting portion 61A that abuts the peripheral portion of the optical disc 1.

Between the eject arms 62 and 63 and the first and second drive cams 44 and 45, a cam mechanism is provided such that the eject arms 611 and 612 are operated in a predetermined manner as the first and second drive cams 44 and 45 are advanced and retracted.

The cam mechanism allows the tip ends of the eject arms 611 and 612 to be released when the optical disc 1 is inserted from the slot 10A and spaces the tip ends from the optical disc 1 by positioning the tip ends at the most released positions when the turntable 23 rotates.

Since the disc guide mechanism 41 has a structure in which the first link 411 on the slot 10A side rotates clockwise, the abutting portion 41A functions as the second disc feeding mechanism by pressing the peripheral portion of the optical disc 1.

The anti-rotation link 424 is provided with a groove or a cutout formed at appropriate positions such that the anti-rotation link 424 does not interfere with the eject arms 611 and 612.

(Operation of Disc Drive)

An operation of the disc drive according to the embodiment will be described.

With reference to FIGS. 4 to 9, an operation to insert and eject the optical disc 1 having a large diameter (12 cm) into and from the disc drive will be described.

When a user manually inserts the optical disc 1 having the large diameter from the slot 10A into the disc drive as shown in FIG. 1, the peripheral portion of the optical disc 1 causes a large rotation of the abutting portion 421A of the arm 421 of the disc diameter detecting mechanism 42 and presses the abutting portion 41A of the disc guide mechanism 41. Thereby, the arm 421 and the connecting member 423 make large rotations, the projection 52 of the connecting member 423 positioned on the common cam groove 53C of the first drive cam 44 moves to the first cam groove 53A side. Additionally, since the connecting member 423 makes the large rotation, the anti-rotation link 424 moves toward the right side in the figure. Accordingly, the stopper 424A provided on the left end of the anti-rotation link 424 becomes deviated from the movement locus of the pin 411A of the disc guide mechanism 41.

Figure 5:
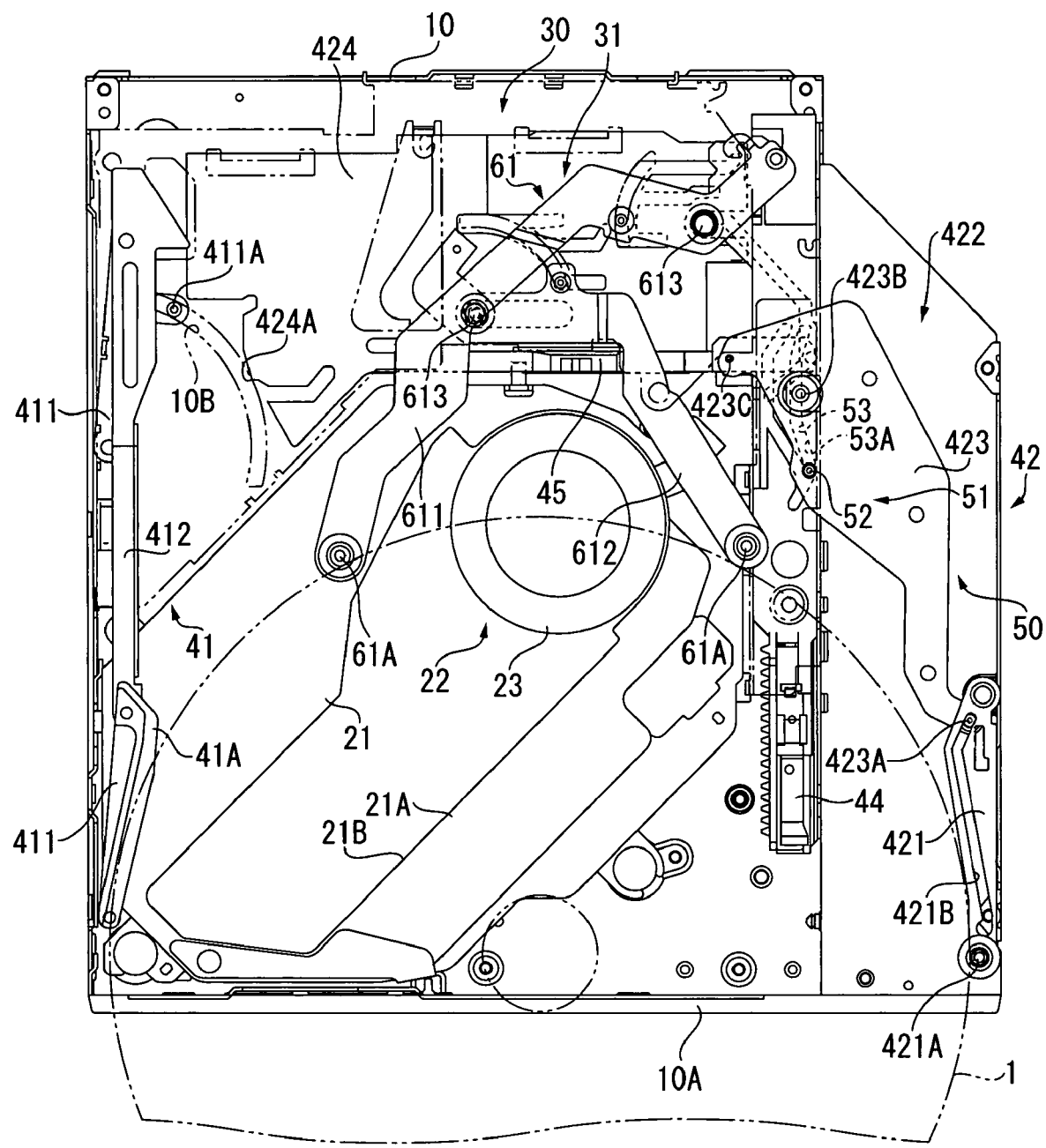
FIG. 5 is an illustration corresponding to FIG. 1, the illustration explaining the first operation of the aforesaid embodiment.

As shown in FIG. 5, when the optical disc 1 is further inserted, the disc guide mechanism 41 is deformed, the second link 412 greatly retracts from the turntable 23, so that the optical disc 1 having the large diameter can be inserted into the drive. The peripheral portion of the optical disc 1 abuts to the abutting portions 61A of the eject arms 611 and 612.

Figure 6:
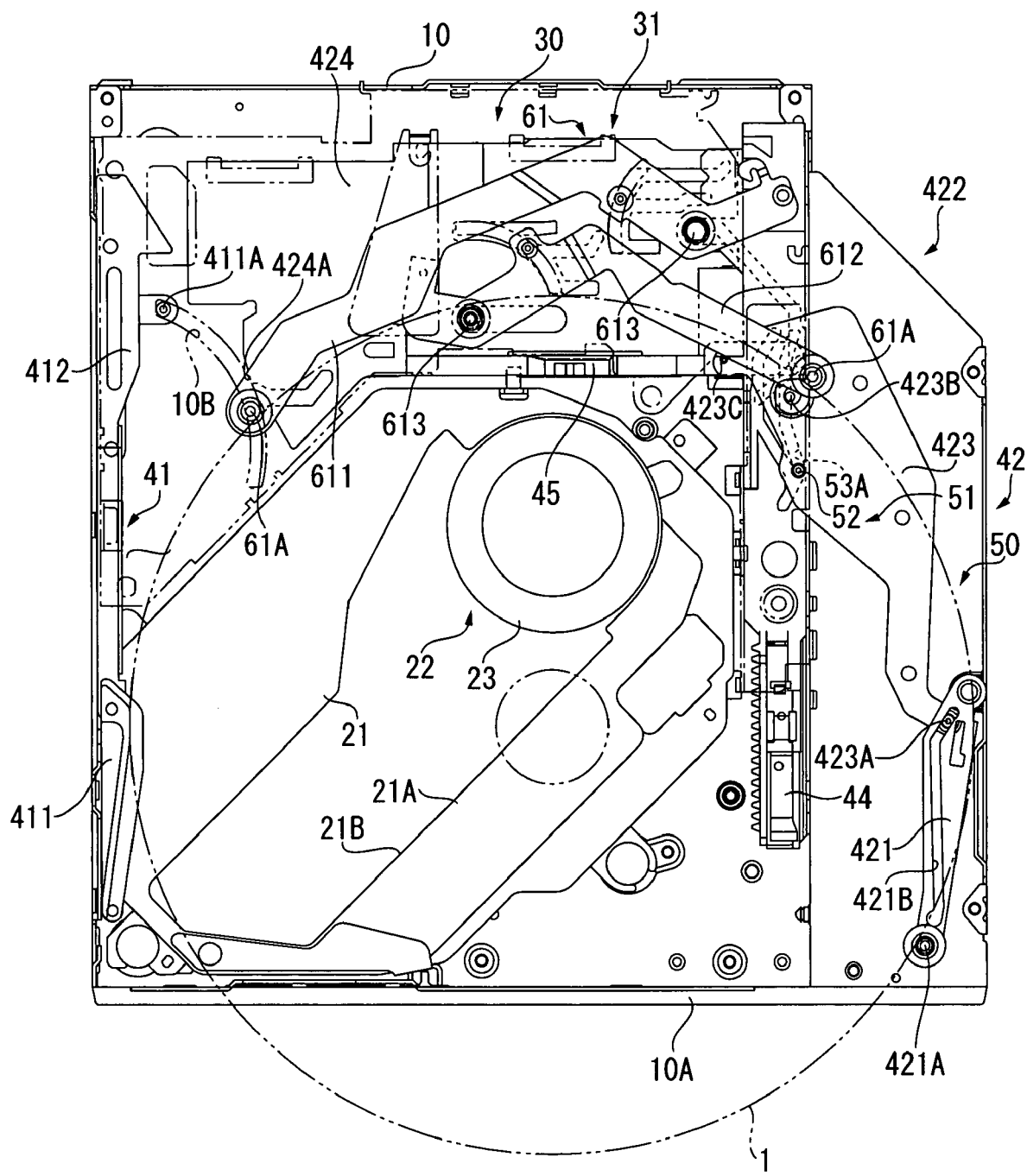
FIG. 6 is an illustration corresponding to FIG. 1, the illustration explaining the first operation of the aforesaid embodiment.

As shown in FIG. 6, when the optical disc 1 is further inserted, the abutting portions 61A of the eject arms 611 and 612 are spaced from each other to hold the optical disc 1. When more than the half of the optical disc 1 has been inserted in the drive, a switch (not shown) operates in accordance with the rotations of the eject arms 611 and 612. In accordance with the operation of the switch, the disc feeding mechanism 50 operates.

Figure 7:
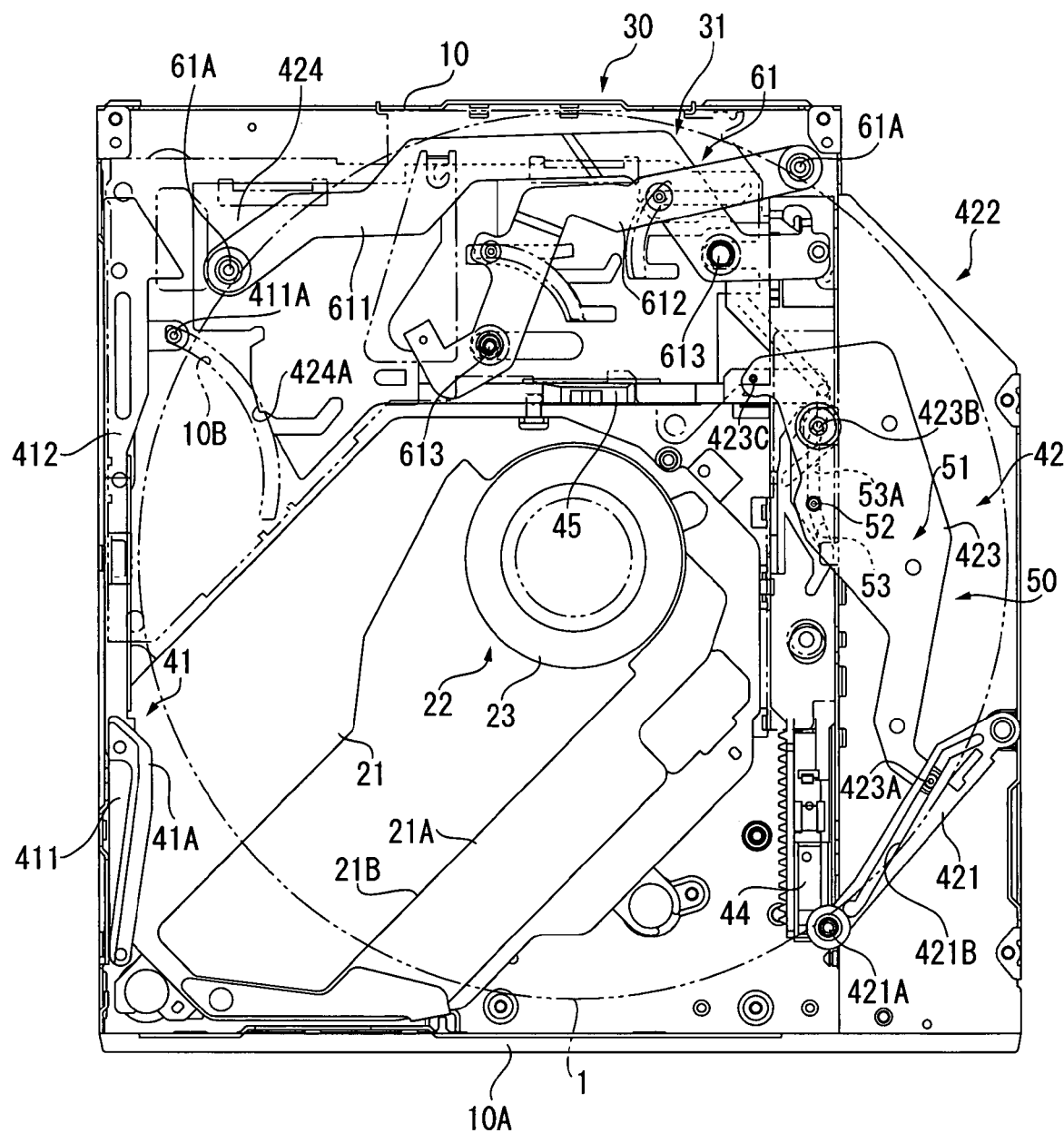
FIG. 7 is an illustration corresponding to FIG. 1, the illustration explaining the first operation of the aforesaid embodiment.

Accordingly, the first drive cam 44 advances and the projection 52 moves along the first cam groove 53A formed in the first drive cam 44. Thereby, the connecting member 423 provided with the projection 52 rotates clockwise, and accordingly the arm 421 rotates clockwise to insert the optical disc 1 to the turntable 23. As shown in FIG. 7, the arm 421 rotates until the center of the optical disc 1 is positioned on the turntable 23.

Figure 8:
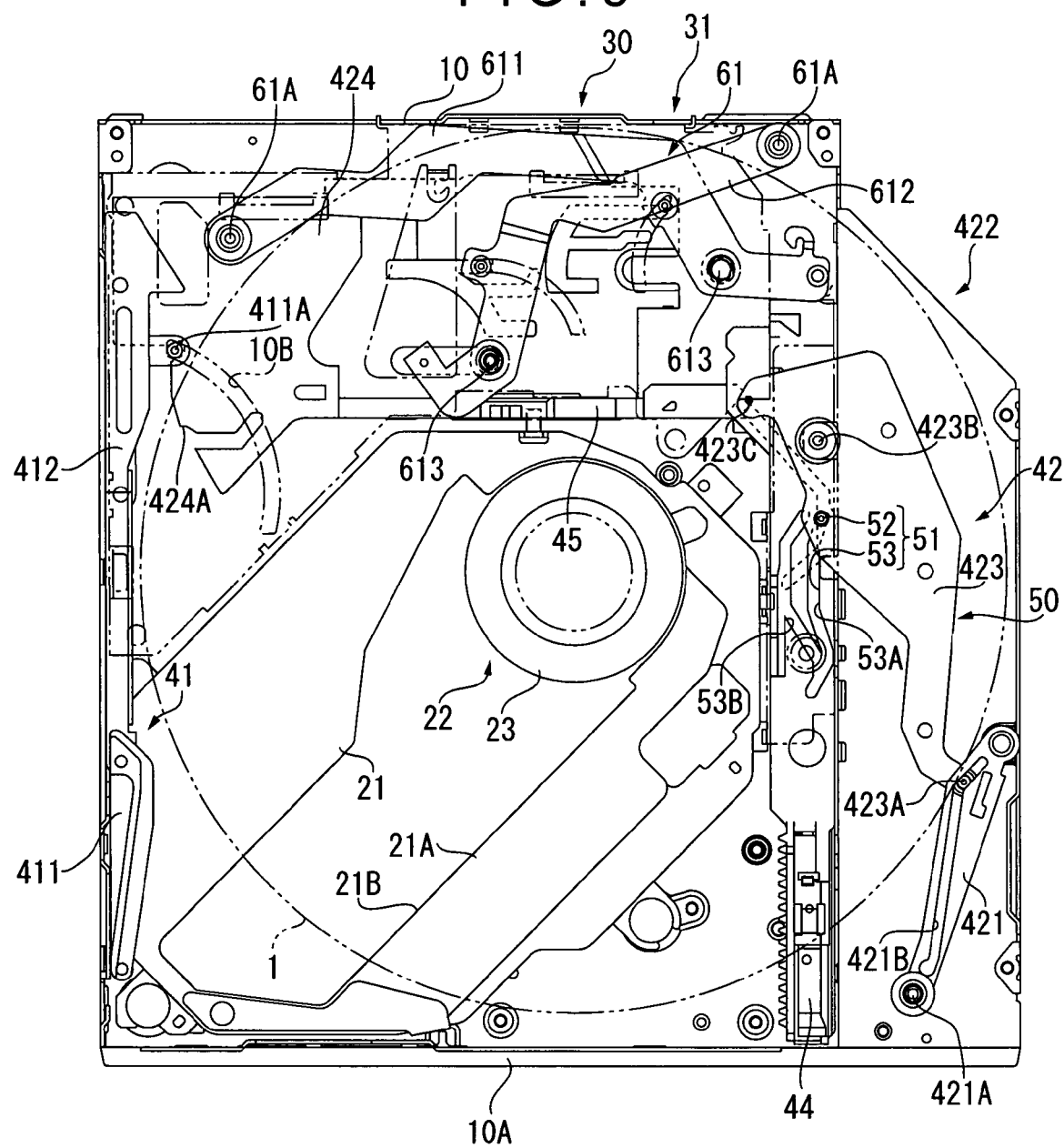
FIG. 8 is an illustration corresponding to FIG. 1, the illustration explaining the first operation of the aforesaid embodiment.

As shown in FIG. 8, when the arm 421 inserts the optical disc 1 to the turntable 23, the projection 52 is guided to the curved portion 53D formed on the end of the first cam groove 53A and the arm 421 rotates in the reverse direction, so that the abutting portion 421A is spaced from the peripheral portion of the optical disc 1. In addition, the eject arms 611 and 612 and the disc guide mechanism 41 are also spaced from the optical disc 1 so as not to prevent the rotation of the optical disc 1.

When the center of the optical disc 1 is positioned on the turntable 23, the movement of the first and second drive cams 44 and 45 causes the base 21 to move closer to the recording surface of the optical disc 1 and the optical disc 1 is clamped to the turntable 23. In this state, the turntable 23 rotates and information is recorded on and/or reproduced from the optical disc 1.

To eject the optical disc 1 from the disc drive, the first and second drive cams 44 and 45 are moved in a reverse direction of the above-described direction such that the base 21 is spaced from the recording surface of the optical disc 1.

The first disc feeding mechanism 61 is operated. Accordingly, the eject arms 611 and 612 are rotated to eject the peripheral portion of the optical disc 1 toward the slot 10A. In this state, the disc guide mechanism 41 is retracted from the turntable 23 and the abutting portion 421A of the arm 421 is kept rotated greatly.

Figure 9:
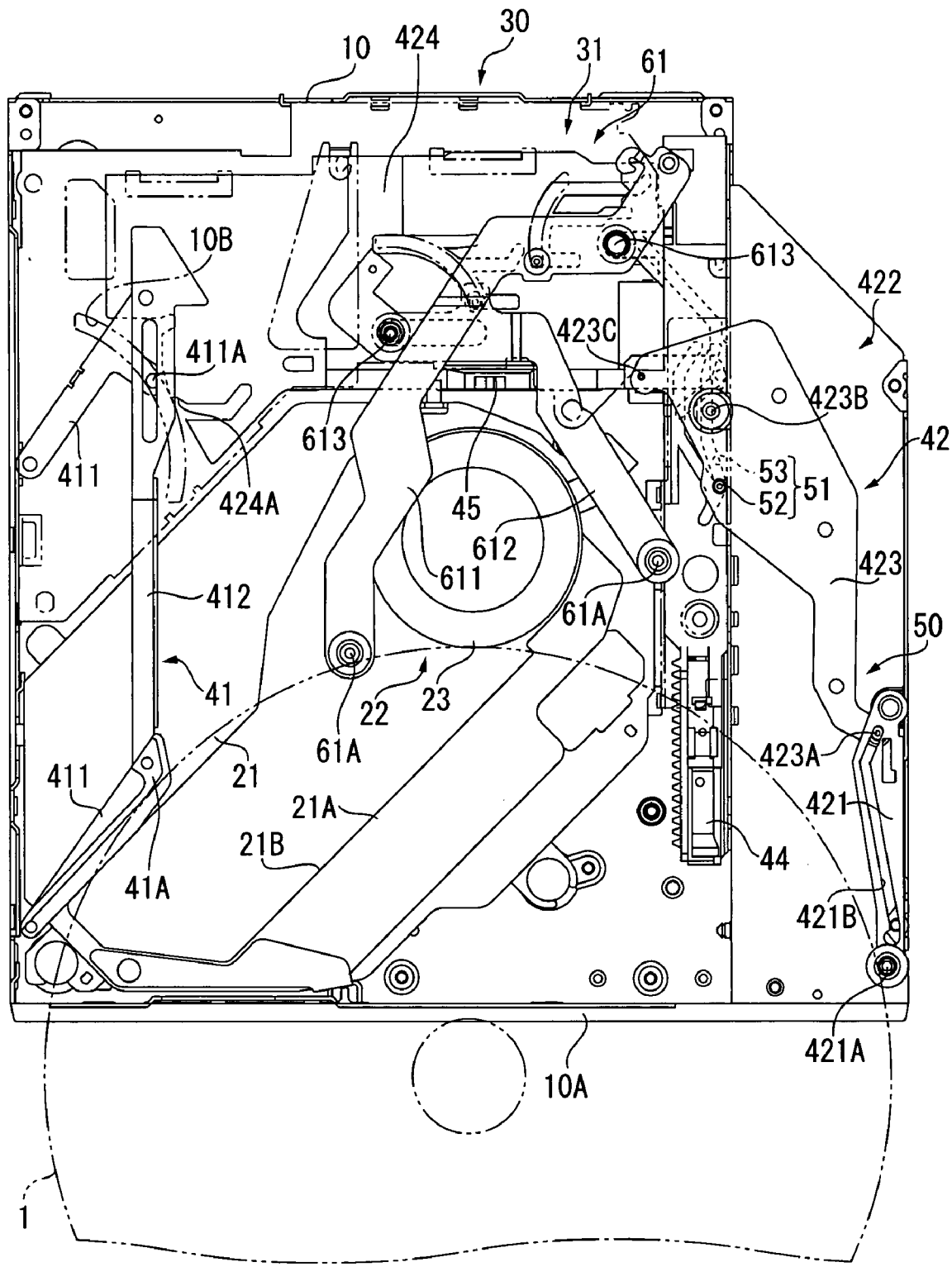
FIG. 9 is an illustration corresponding to FIG. 1, the illustration explaining the first operation of the aforesaid embodiment.

As shown in FIG. 9, when substantially more than the half of the optical disc 1 is ejected by the eject arms 611 and 612 from the slot 10A, the eject arms 611 and 612 can not press the optical disc 1, but the disc guide mechanism 41 (as the second disc feeding mechanism) operates such that the optical disc 1 can be completely ejected from the slot 10A. Specifically, the first link 411 is rotated clockwise by biasing force of the spring, so that the abutting portion 41A presses the peripheral portion of the optical disc 1 to eject the optical disc 1.

Next, with reference to FIGS. 10 to 14, an operation to insert and eject the optical disc 1 having a small diameter (8 cm) into and from the disc drive will be described.

Figure 10:
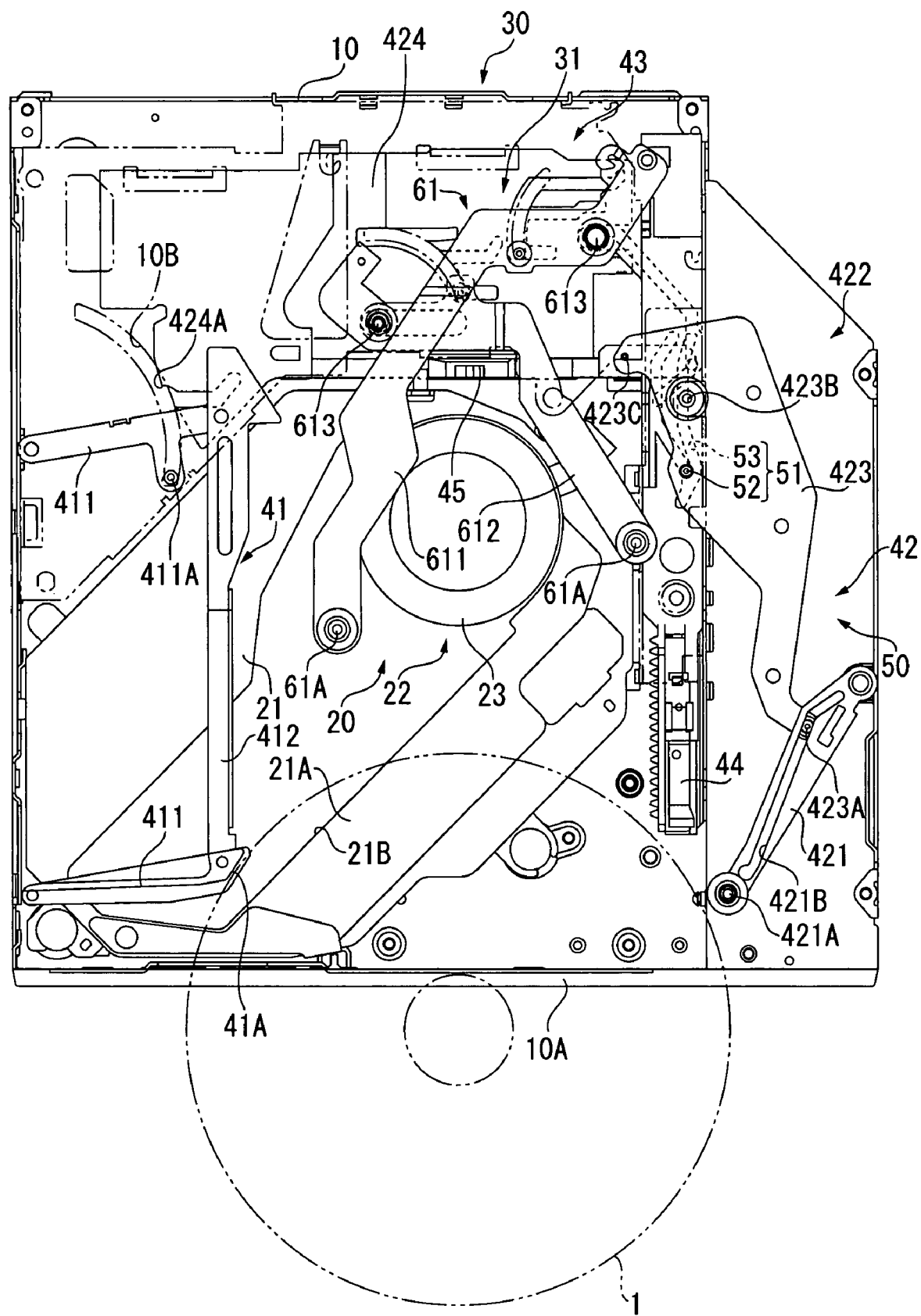
FIG. 10 is an illustration corresponding to FIG. 1, the illustration explaining a second operation of the aforesaid embodiment in which a small optical disc is set.

When a user manually inserts the optical disc 1 having the small diameter from the slot 10A into the disc drive as shown in FIG. 10, the peripheral portion of the optical disc 1 causes a small counterclockwise rotation of the abutting portion 421A of the arm 421 and presses the abutting portion 41A of the disc guide mechanism 41. Thereby, since the movement amount of the connecting member 423 that rotates with the arm 421 is small, the projection 52 positioned on the common cam groove 53C of the first drive cam 44 remains on the second cam groove 53B side. Additionally, since the rotation amount of the connecting member 423 is small, the movement toward the right side in the figure of the anti-rotation link 424 is extremely small. Accordingly, the stopper 424A provided on the left end of the anti-rotation link 424 is positioned on the movement locus of the pin 411 A of the disc guide mechanism 41 (see FIGS. 2A and 2B).

Figure 11:
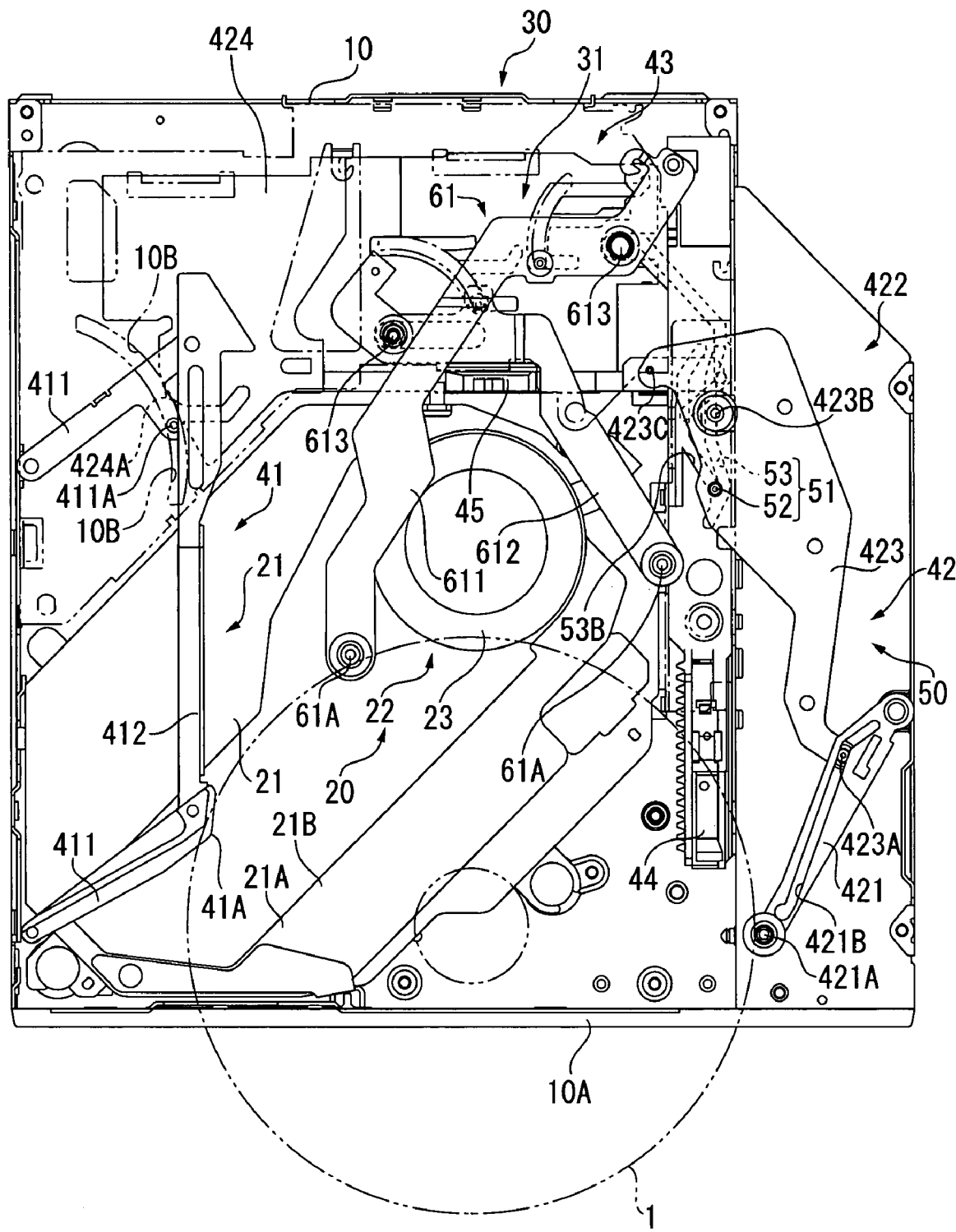
FIG. 11 is an illustration corresponding to FIG. 1, the illustration explaining the second operation of the aforesaid embodiment.

As shown in FIG. 11, when the optical disc 1 is further inserted, the disc guide mechanism 41 is deformed. However, when the pin 411 A abuts to the stopper 424A of the anti-rotation link 424, the deformation of the disc guide mechanism 41 will stop. In this state, when the optical disc 1 is further inserted, the optical disc 1 abuts to the abutting portions 61A of the eject arms 611 and 612.

When more than the half of the optical disc 1 has been inserted in the drive, a switch (not shown) operates in accordance with the rotations of the eject arms 611 and 612. In accordance with the operation of the switch, the disc feeding mechanism 50 operates.

Figure 12:
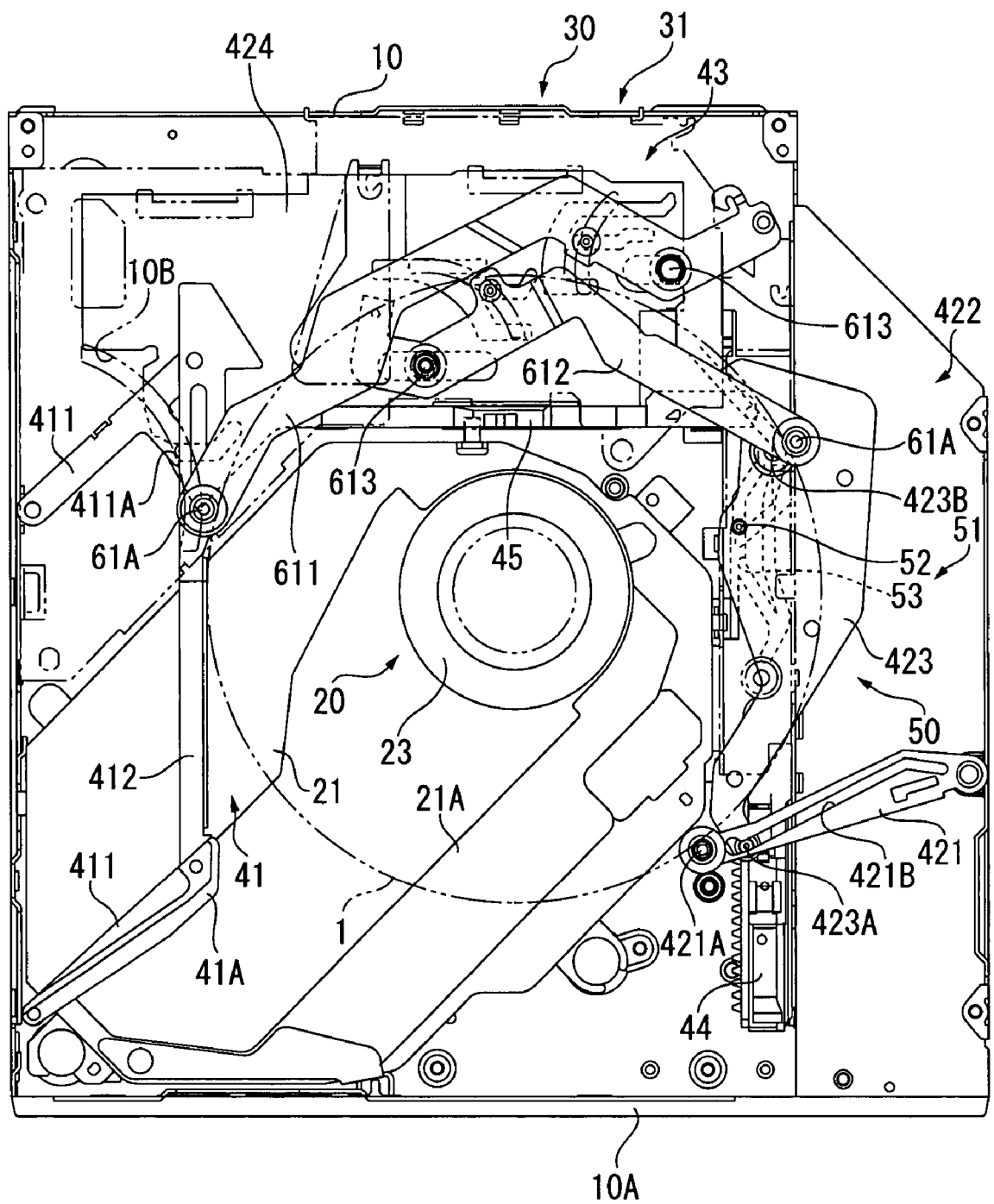
FIG. 12 is an illustration corresponding to FIG. 1, the illustration explaining the second operation of the aforesaid embodiment.

Accordingly, the first drive cam 44 advances and the projection 52 moves along the second cam groove 53B formed in the first drive cam 44. Thereby, the connecting member 423 provided with the projection 52 makes a large rotation clockwise and accordingly the arm 421 rotates clockwise to press and insert the optical disc 1 to the turntable 23. Thus, the projection 52 moves along the second cam groove 53B, the rotation amount of the arm 421 is larger than that of the above-described large optical disc 1. As shown in FIG. 12, the arm 421 rotates until the center of the optical disc 1 is positioned on the turntable 23.

Figure 13:
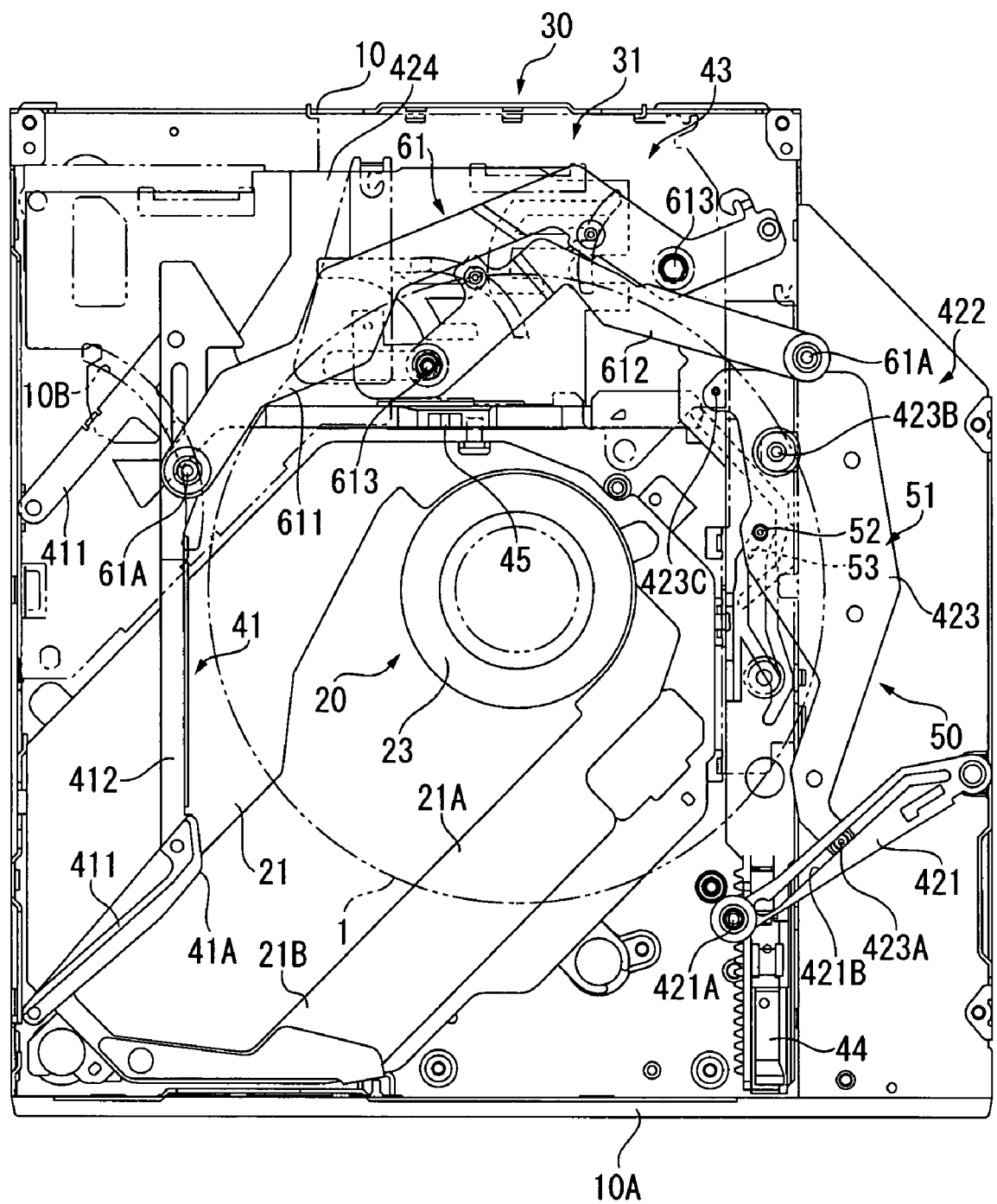
FIG. 13 is an illustration corresponding to FIG. 1, the illustration explaining the second operation of the aforesaid embodiment.

As shown in FIG. 13, when the arm 421 inserts the optical disc 1 to the turntable 23, the projection 52 is guided to the curved portion 53D formed on the end of the second cam groove 53B and the arm 421 rotates in the reverse direction, so that the abutting portion 421A is spaced from the peripheral portion of the optical disc 1. In addition, similarly to the above description, the eject arms 611 and 612 and the disc guide mechanism 41 are spaced from the optical disc 1 so as not to prevent the rotation of the optical disc 1.

Figure 14:
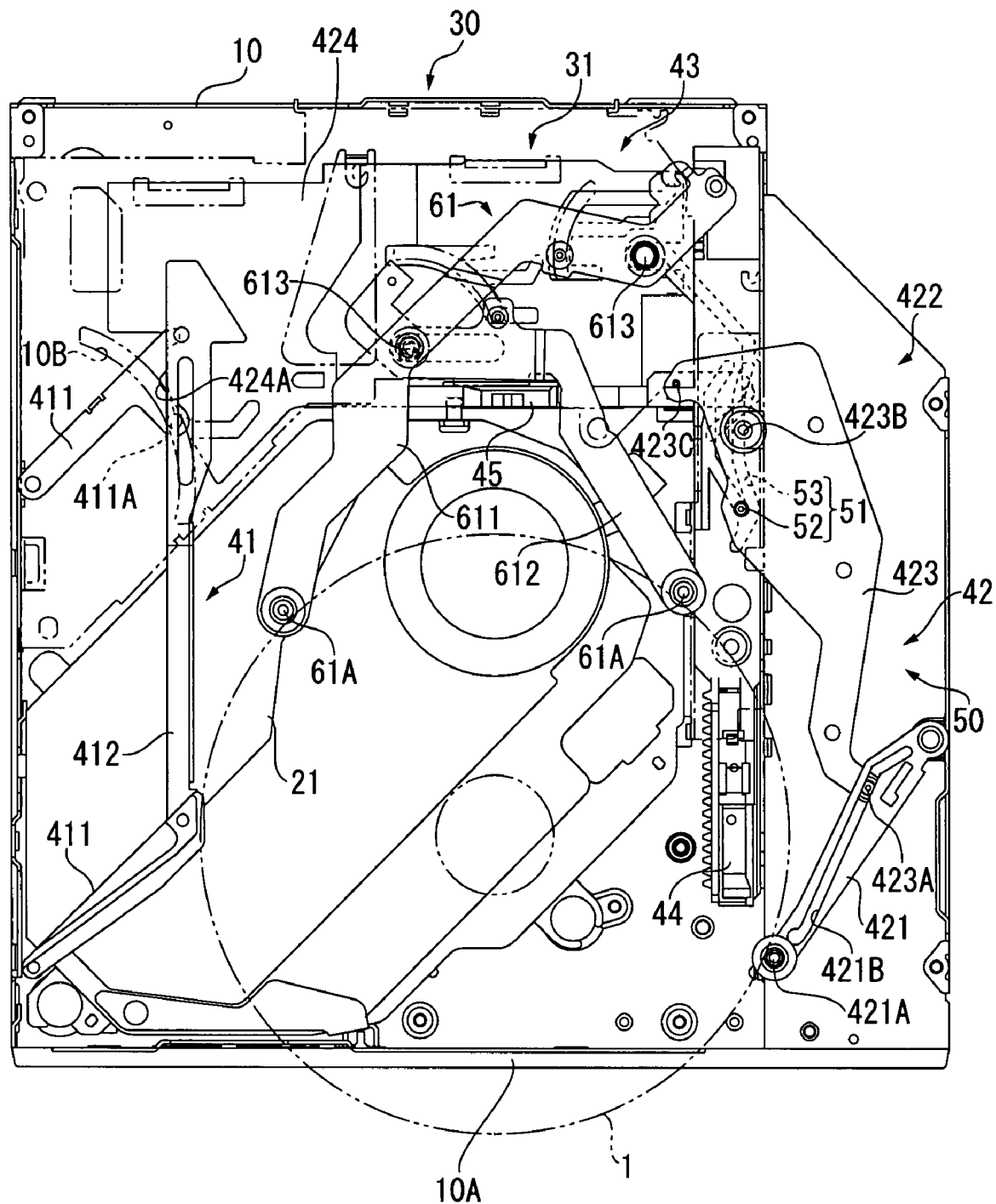
FIG. 14 is an illustration corresponding to FIG. 1, the illustration explaining the second operation of the aforesaid embodiment.

To eject the optical disc 1 from the disc drive, the first disc feeding mechanism 61 is operated in a similar manner as described above. Specifically, as shown in FIG. 14, the eject arms 611 and 612 are rotated so as to press and eject the peripheral portion of the optical disc 1 toward the slot 10A.

After more than substantially the half of the optical disc 1 is ejected from the slot 10A by the eject arms 611 and 612, the eject arms 611 and 612 cannot press the optical disc 1. However, since biasing force of the spring rotates the first link 411 of the disc guide mechanism 41 clockwise, the abutting portion 41A presses and ejects the peripheral portion of the optical disc 1.

(Effects and Advantages of Disc Drive)

As described above, the present embodiment can provide following exemplary effects and advantages.

(1) Since the disc drive of the embodiment includes the disc guide mechanism 41 that is provided on one end side of the slot 10A in the drive unit body 10 and guides the optical disc 1; and the disc diameter detecting mechanism 42 that is provided on the other end side of the slot 10A in the drive unit body 10 and retracts the disc guide mechanism 41 when the optical disc 1 inserted in the slot 10A is large and advances the disc guide mechanism 41 when the optical disc 1 is small, the optical disc 1 can be centered in accordance with the diameter of the optical disc 1 by the disc guide mechanism 41 and the disc diameter detecting mechanism 42 that are respectively positioned on the sides of the slot 10A. Hence, even when a pair of rollers is not provided with the front and rear surfaces of the optical disc 1 interposed, and even when a switch or the like for judging the diameter of the optical disc 1 is not provided, the optical discs 1 having different diameters can be used in a thinned disc drive.

(2) Since the disc guide mechanism 41 is biased toward the advancing direction, it is not necessary that the drive have a structure for causing a large movement of the disc guide mechanism 41 when the optical disc 1 having a small diameter is inserted. Hence, the structure of the drive can be simple.

(3) Since, the disc diameter detecting mechanism 42 is provided with the arm 421 of which one end abuts to the optical disc 1 and the other end is rotatable; and the arm link mechanism 422 that is connected with the arm 421 and allows the disc guide mechanism 41 to retract when a rotation angle of the arm 421 is large while prevents the disc guide mechanism 41 from retracting when the rotation angle of the arm 421 is small, the diameter of the optical disc 1 can be judged by the rotation angle of the arm 421, so that the disc guide mechanism 41 can be controlled by the arm link mechanism 422 based on the judgment. Hence, even when the diameter variation of the optical disc 1 is 3 or more, the optical disc 1 can be centered in accordance with each diameter.

(4) Since the disc guide mechanisms 41 are positioned apart from each other with a predetermined distance and one ends of the disc guide mechanisms 41 each have the two first links 411 rotatably supported by the drive unit body 10 and the second link 412 that connects the other ends of the first links 411 and moves toward and apart from the turntable 23 in accordance with the rotation of the first links 411, the optical discs 1 having different diameters can be guided by such a simple arrangement of the parallel link.

(5) Since the disc diameter detecting mechanism 42 is provided with the anti-rotation link 424 that prevents the rotation of the first links 411, retraction of the disc guide mechanism 41 can be reliably prevented by such a simple arrangement of the anti-rotation link 424.

(6) The abutting portion 41A abutting to the optical disc 1 is provided in the vicinity of the connecting portion of the first links 411 and the second link 412. Since the vicinity of the connecting portion of the first links 411 and the second link 412 is an area to which the optical disc 1 inserted from the slot 10A easily abuts, owing to the abutting portion 41A provided on this area, the parallel link formed of the first links 411 and the second link 412 can be smoothly deformed, so that the disc guide mechanism 41 can be reliably operated.

(7) Since the disc guide mechanism 41 and the disc diameter detecting mechanism 42 are adapted to be spaced from the optical disc 1 when the turntable 23 is rotating, the disc guide mechanism 41 and the disc diameter detecting mechanism 42 do not interfere with the optical disc 1 when information is recorded on and/or reproduced from the recording surface of the optical disc 1.

(8) Since the disc drive is provided with the switch that detects that the optical disc 1 has been inserted to a predetermined position from the slot 10A; and the arm 421 presses and inserts the optical disc 1 toward a rear side in accordance with the detection by the switch, the disc diameter detecting mechanism 42 can be operated at appropriate timing.

(9) The arm 421 and the disc guide mechanism 41 are positioned in a plane in which the optical disc 1 is disposed. This arrangement also contributes to the downsizing in thickness of the disc drive.

(10) The disc guide mechanism 41, the arm 421, the connecting member 423 and the anti-rotation link 424 are disposed so as to enclose the turntable 23. In other words, these components are reasonably positioned in a spatially economical manner. Hence, the downsizing in thickness of the disc drive can be achieved.

(11) Since the disc drive of the embodiment is provided with the disc feeding mechanism 50 that is disposed in the drive unit body 10 and feeds the optical disc 1 inserted in the slot 10A to the turntable 23, the disc feeding mechanism 50 reducing the feeding amount when the optical disc 1 is large and increasing the feeding amount when the optical disc 1 is small, the two types of optical discs 1 having different diameters of 12 cm and 8 cm can be fed from the slot 10A to the turntable 23. Hence, even when a pair of rollers is not provided with the front and rear surfaces of the optical disc 1 interposed and even when a switch or the like for judging the diameter of the optical disc 1 is not provided, the optical disc 1 having different diameters can be fed from the slot 10A to the turntable 23.

(12) The disc feeding mechanism 50 is provided with the arm 421 of which one end abuts to the optical disc 1 and the other end is rotatable; the connecting member 423 of which one end is connected with the arm 421; and the first drive cam 44 with which the other end of the connecting member 423 is connected, the first drive cam 44 advancing and retracting. The connecting member 423 and the first drive cam 44 are each provided with the disc feeding cam portion 51 that reduces the rotation amount of the arm 421 when the optical disc 1 is large and increases the rotation amount of the arm 421 when the optical disc 1 is small. The diameter of the optical disc 1 can be judged by the rotation angle of the arm 421. The connecting member 423 and the first drive cam 44 are relatively moved by the disc feeding cam portion 51 based on the judgment. With the arrangement, even when the diameter of the optical disc 1 varies, the optical disc 1 can be accurately fed to the turntable 23 in accordance with each diameter by such a simple arrangement of the turntable 23.

(13) The disc feeding cam portion 51 is provided with the projection 52 provided to the connecting member 423; and the cam groove 53 that is engaged with the projection 52 and formed in the first drive cam 44. The cam groove 53 includes the first cam groove 53A that feeds the optical disc 1 having a large diameter and the second cam groove 53B that feeds the optical disc 1 having a small diameter. The disc feeding cam portion 51 can be formed by providing the plurality of cam grooves to the first drive cam 44 and by providing the projection 52 to the connecting member 423. With the arrangement, manufacturing cost of the disc feeding cam portion 51 can be reduced.

(14) Since the common cam groove 53C is provided to the first drive cam 44 at the area on which one ends of the first and second cam grooves 53A and 53B join together, by engaging the projection 52 with the common cam groove 53C in advance before switching the projection 52 to the first cam groove 53A or the second cam groove 53B, the switching between the first cam groove 53A and the second cam groove 53B can be smooth.

(15) Since the first drive cam 44 also serves as the drive cam that moves the turntable 23 toward and away from the optical disc 1, the number of components can be reduced, thereby contributing to the downsizing and cost reduction of the disc drive.

(16) Since the connecting member 423 is formed substantially in a flat plate shape, the downsizing in thickness of the disc drive can be achieved.

(17) Since the projection 423A is provided to the connecting member 423 and the guide groove 421B that guides the projection 423A is provided to the arm 421, the rotation of the arm 421 can be reliably transmitted to the connecting member 423 by such a simple arrangement of the projection 423A and the guide groove 421B.

(18) Since the roller-like abutting portion 421A is provided on the tip end of the arm 421, even if the optical disc 1 is inserted with strong force from the slot 10A, the abutting portion 421A that abuts to the optical disc 1 is rotated, thereby preventing damage on the peripheral portion of the optical disc 1.

(19) Since the disc drive of the embodiment is provided with the disc ejecting mechanism 43 that ejects the optical disc 1 disposed on the turntable 23 to the slot 10A; and the disc ejecting mechanism 43 is provided with the first disc feeding mechanism 61 positioned on a rear side in the drive unit body 10 and the second disc feeding mechanism that is positioned on the slot 10A side of the first disc feeding mechanism 61 and feeds the optical disc 1 fed by the first disc feeding mechanism 61 to the slot 10A, the optical disc 1 having a small diameter can be transferred from the turntable 23 to the slot 10A by the first disc feeding mechanism 61 and the second disc feeding mechanism respectively positioned on a rear side and opening side of the slot 10A in order to eject the optical disc 1 to the outside, so that the optical disc 1 can be ejected from the slot 10A to the outside without necessity of providing the pair of rollers provided on the front and rear surface sides of the optical disc 1 or providing a switch or the like that judges the diameter of the optical disc 1.

(20) Since the second disc feeding mechanism also serves as the disc guide mechanism 41, the number of components can be reduced, thereby contributing to the downsizing and cost reduction of the disc drive.

(21) Since the first disc feeding mechanism 61 is provided with the eject arms 611 and 612 of which one ends are rotatably supported in the drive unit body 10 and the other ends abut to the peripheral portion of the optical disc 1. Hence, by rotating the one ends of the eject arms 611 and 612, the optical disc 1 can be easily fed toward the slot 10A, so that the arrangement of the first disc feeding mechanism 61 can be simple.

(22) Since the roller-like abutting portion 61A that abuts to the peripheral portion of the optical disc 1 is provided on each tip end of the eject arms 611 and 612, the abutting portion 421A abutting to the optical disc 1 is rotated when the optical disc 1 is inserted from the slot 10A, thereby preventing damage on the peripheral portion of the optical disc 1.

(23) Since the pair of eject arms 611 and 612 is provided with the turntable 23 interposed, force is applied on the right and left sides of the optical disc 1, which enables the optical disc 1 to be linearly fed to the slot 10A.

Modifications of Embodiment

The present invention is not limited to the embodiment above, but includes following exemplary modifications without departing from the scope of the invention.

For example, although the disc guide mechanism 41 is constantly biased in the advancing direction, a motor and a gear mechanism may be provided such that the disc guide mechanism 41 is advanced and retracted.

Although the disc diameter detecting mechanism 42 detects the diameter of the optical disc 1 with the arm 421 of which one end abuts to the optical disc 1 and the other end is rotatable, the arrangement is not limited thereto. For example, a rod may be provided along the slot 10A and advancement and retraction of the rod may be interlocked via a cam mechanism or the like.

The disc guide mechanism 41 may not be limited to the parallel link formed of the two first links 411 and the one second link 412. Coil springs may be directly connected with the ends of the second link 412.

In the invention, the disc feeding mechanism 50 and the disc ejecting mechanism 43 may not be provided. Even when the disc ejecting mechanism 43 is provided, another arrangement may be employed in which the disc guide mechanism 41 and the second disc feeding mechanism are individually provided.

As the optical discs 1 having different diameters, the two types of 8 cm and 12 cm have been exemplified, three or more diameter types of optical disc 1 may be handled.

In addition to the above examples, the arrangements or the procedure for implementing the present invention may be changed as long as an object of the invention can be achieved.

Effects and Advantages of Embodiment

As stated above, since the disc drive is provided with the drive unit body 10 including the slot 10A that allows insertion and ejection of the optical disc 1; the turntable 23 that is provided in the drive unit body 10 and rotates the optical disc 1; the disc guide mechanism 41 that is provided on the one end side of the slot 10A in the drive unit body 10 and guides the optical disc 1; and the disc diameter detecting mechanism 42 that is provided on the other end side of the slot 10A in the drive unit body 10 and retracts the disc guide mechanism 41 when the optical disc 1 inserted in the slot 10A is large and advances the disc guide mechanism 41 when the optical disc 1 is small, the optical disc 1 can be centered in accordance with the diameter thereof by the disc guide mechanism 41 and the disc diameter detecting mechanism 42 respectively positioned on the ends of the slot 10A. Hence, even when a pair of rollers is not provided with the front and rear surfaces of the optical disc 1 interposed, and even when a switch or the like for judging the diameter of the optical disc 1 is not provided, the disc drive can handle optical discs 1 having different diameters.

INDUSTRIAL APPLICABILITY

The present invention is applicable to a recording medium drive equipped with a slot that is provided to a drive unit body and allows insertion and ejection of a disc-like recording medium; and a driving section that is provided substantially at a center portion in the drive unit body and rotates the disc-like recording medium.

The invention claimed is:

1. A recording medium drive, comprising:
    a drive unit body having a slot for allowing insertion and ejection of a disc-like recording medium;
    a driving portion that is provided in the drive unit body and rotates the disc-like recording medium;
    a disc guide mechanism that is provided on one end side of the slot and guides the disc-like recording medium; and
    a disc diameter detecting mechanism that is connected with the disc guide mechanism and moves the disc guide mechanism in accordance with a diameter of the disc-like recording medium, wherein
    the disc guide mechanism is disposed on the one end side of the slot and biased toward the opposite end side, and
    the disc diameter detecting mechanism retracts the disc guide mechanism toward the one end side when the disc-like recording medium having a large diameter is inserted in the slot.

2. The recording medium drive according to claim 1, wherein
    the disc diameter detecting mechanism is proved with an arm of which one end abuts to the disc-like recording medium and the other end is rotatable; and an aim link mechanism that is connected with the arm and allows movement of the disc guide mechanism when the inserted disc-like recording medium has a large diameter and prevents movement of the disc guide mechanism when the inserted disc-like recording medium has a small diameter.

3. The recording medium drive according to claim 1, wherein
    the disc guide mechanism is provided with first links that are positioned with a predetermined distance therebetween, one end of each first link rotatably supported by the drive unit body; and a second link that connects the other ends of the first links and moves toward and away from the driving portion in accordance with rotation of the first links.

4. The recording medium drive according to claim 3, wherein
    the disc diameter detecting mechanism is provided with an anti-rotation link that prevents the rotation of the first links.

5. The recording medium drive according to claim 3, further comprising:
    an abutting portion that is provided in the vicinity of a connecting portion of the first links and the second link and abuts to the disc-like recording medium.

6. The recording medium drive according to claim 1, wherein
    the disc guide mechanism and the disc diameter detecting mechanism are spaced from the disc-like recording medium when the driving portion is driving.

7. The recording medium drive according to claim 2, further comprising:
    a switch that detects that the disc-like recording medium is inserted from the slot to a predetermined position, wherein
    the disc diameter detecting mechanism presses the disc-like recording medium toward the driving portion by the arm when the switch detects that the disc-like recording medium is inserted to the predetermined position.

8. The recording medium drive according to claim 2, wherein
    the arm and the disc guide mechanism are disposed in a plane in which the disc-like recording medium is disposed.

* * * * *